(12) United States Patent
Takagi et al.

(10) Patent No.: US 6,798,618 B2
(45) Date of Patent: Sep. 28, 2004

(54) HEAD SUSPENSION FOR DISK DRIVE

(75) Inventors: Yasuji Takagi, Yokohama (JP); Norio Horle, Yokohama (JP); Osamu Ohkawara, Yokohama (JP); Masao Hanya, Yokohama (JP); Kouji Uozumi, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 163 days.

(21) Appl. No.: 09/811,072

(22) Filed: Mar. 16, 2001

(65) Prior Publication Data

US 2002/0051317 A1 May 2, 2002

(30) Foreign Application Priority Data

Oct. 30, 2000 (JP) .................................. 2000-331446
Feb. 9, 2001 (JP) .................................. 2001-034480

(51) Int. Cl.[7] ............................. G11B 21/16; G11B 5/48
(52) U.S. Cl. ............................. 360/244.5; 360/244.9; 360/244.8
(58) Field of Search ............................. 360/244.5, 244.9, 360/244.8, 244.3, 244.2, 244, 240

(56) References Cited

U.S. PATENT DOCUMENTS 4,991,045 A    2/1991  Oberg et al. ............. 360/244.3
5,828,521 A  * 10/1998  Hasegawa ................. 360/266.1
6,052,258 A  *  4/2000  Albrecht et al. .......... 360/245.2
6,487,053 B1 * 11/2002  Matsumura et al. ....... 360/265.7

FOREIGN PATENT DOCUMENTS

JP          60-127578           7/1985

OTHER PUBLICATIONS

Masao Hanya et al. "Suspension Design for Windage and High Bandwidth" (Treatise), Presented on Mar. 27, 2000.

* cited by examiner

Primary Examiner—Julie Anne Watko
(74) Attorney, Agent, or Firm—Kilpatrick Stockton LLP

(57) ABSTRACT

A head suspension for a disk drive has support plate means (3, 7) serving as a carriage arm and a load beam (5). The load beam consists of a rigid part (13) and a resilient part (15), to apply load to a slider (43) of a head. The support plate means (3, 7) consists of at least layered two plates (3, 7). At least one (7) of the plates (3, 7) has a thickness (t2) appropriate for forming precision holes therethrough by etching. A pivot hole (31) is formed through the plate (7). A loose hole (9) larger than and substantially concentric with the pivot hole is formed through the plate (3). The plates (3, 7) have improved flatness, and the pivot hole has improved accuracy.

3 Claims, 14 Drawing Sheets

HEAD SUSPENSION FOR DISK DRIVE

BACKGROUND OF THE INVENTION

1. Field of the Invention

The present invention relates to a head suspension for a disk drive incorporated in an information processing unit such as a personal computer.

2. Description of the Related Art

A head suspension (hereinafter referred to also as "suspension") for a disk drive has a base plate and a load beam welded to an end of the base plate. The base plate is used to attach the suspension to a carriage arm of the disk drive. In the disk drive, the suspension is arranged in a space between the carriage arm and a disk. The suspension has a certain height that hinders the miniaturization of the disk drive.

To reduce the height of the suspension, Japanese Patent No. 3089360 discloses a suspension 101 shown in FIGS. 1 and 2. The suspension 101 has a long base plate 103 and a load beam 105 welded to the long base plate 103. The long base plate 103 has a pivot hole 107, which is correctly fitted to a carriage in a disk drive. This prior art uses the long base plate 103 as a carriage arm, to reduce a space between adjacent disks 109 and miniaturize the disk drive.

This prior art, however, has some problems. The flatness of the long base plate 103 is deteriorated when the pivot hole 107 is directly formed through the long base plate 103. The long base plate 103 must secure rigidity because it must serve as a carriage arm. To secure the rigidity, the long base plate 103 has a specified thickness. If the pivot hole 107 is formed through the long base plate 103 by etching, the accuracy of the pivot hole 107 will be low due to the thickness of the long base plate 103. Accordingly, the long base plate 103 with the pivot hole 107 must be formed by press.

The holing by press leaves residual deformation on the long base plate 103, to deteriorate the flatness of the long base plate 103.

SUMMARY OF THE INVENTION

An object of the present invention is to provide a head suspension for a disk drive, capable of having precise pivot holes and flatness.

In order to accomplish the object, a first aspect of the present invention provides a head suspension for a disk drive, having support plate means fitted to and supported by a support of a carriage in the disk drive, the support plate means serving as a carriage arm of the carriage, and a load beam resiliently supported by the support plate means and having at least a rigid part, for applying load onto a slider of a head. The first aspect is characterized in that the support plate means is at least made of layered first and second plates, at least the first plate has a thickness appropriate for forming precision holes therethrough by etching, a pivot hole to be fitted to the support of the carriage is formed through the first plate, and one of a pivot hole and a loose hole is formed through the second plate, the pivot hole being equal to and concentric with the pivot hole of the first plate, the loose hole being larger than and substantially concentric with the pivot hole of the first plate.

The first aspect forms the support plate means at least with layered two plates. At least a first plate of the layered structure is provided with a thickness appropriate for forming precision holes therethrough by etching, and a pivot hole is formed through the first plate by etching. This pivot hole is, therefore, highly accurate.

If a second plate of the layered structure is thick, the first aspect forms a loose hole through the second plate, the loose hole being larger than and substantially concentric with the pivot hole of the first plate. This loose hole may have lower accuracy, and therefore, it can be formed by etching. The first aspect may provide the second plate with a thickness appropriate for forming precision holes therethrough by etching and may form a precision pivot hole through the second plate by etching.

The precision pivot hole(s) is precisely fitted to and supported by a support of a carriage in a disk drive. The first aspect is capable of processing the at least two layered plates of the support plate means by etching, to improve the flatness of the support plate means.

A second aspect of the present invention forms the second plate with a resin layer and a metal layer and interposes the resin layer between the first plate and the metal layer, to provide a three-layer structure for the support plate means.

The second aspect employs the first plate as a main vibration system and the second plate as a supplementary vibration system involving the spring constant and attenuation of the resin layer and the mass of the metal layer, to improve the vibration characteristics of the head suspension as a whole. At the same time, the second aspect secures the effect of the first aspect.

A third aspect of the present invention forms a long base plate with the first and second plates.

The third aspect processes the first and second plates and pivot holes by etching, to improve the accuracy of the pivot holes. While securing the effects of the first and second aspects, the third aspect precisely fits the pivot holes to a support of a carriage so that the support of the carriage may correctly hold the head suspension. The third aspect also secures the flatness of the long base plate.

A fourth aspect of the present invention further has a resilient material for supporting the rigid part of the load beam with respect to the support plate means. A first end of the resilient material is laid on and fixed to an end of the rigid part, and a second end of the resilient material is laid on and fixed to an end of the long base plate.

While securing the effect of the third aspect, the fourth aspect forms a resilient part of the load beam from the resilient material that is separate from the rigid part of the load beam. The rigid part and resilient part can have their respective materials and thicknesses, to simultaneously realize requirements such as high rigidity for the rigid part and a low spring constant for the resilient part. The resilient part may be made of a precision material to provide a stable low spring constant.

The fourth aspect may make the rigid part thick to realize high rigidity without bends or ribs. This rigid part smooths air flows, suppresses the influence of turbulence due to the high-speed rotation of disks, and prevents the fluttering of the head suspension.

A fifth aspect of the present invention constitutes the load beam with the rigid part and a resilient part for resiliently supporting the rigid part with respect to the support plate means, and integrally makes the load beam from a single plate. The fifth aspect places an end of the load beam on an end of the long base plate of the third aspect and fixes it thereto.

While securing the effect of the third aspect, the fifth aspect simplifies the structure of the head suspension.

A sixth aspect of the present invention makes the first plate integral with the load beam and forms the second plate into a long base plate.

The sixth aspect processes the plates and pivot holes by etching, to improve the accuracy of the pivot holes and the flatness of the plates. While securing the effects of the first and second aspects, the sixth aspect improves the flatness of the first plate integral with the load beam and the second plate serving as a long base plate, and simplifies the manufacturing of the head suspension by integrally forming the first plate and load beam.

A seventh aspect of the present invention integrally provides the first plate with a resilient part for supporting the rigid part with respect to the support plate means. Also, the seventh aspect places an end of the load beam on an end of the resilient part and fixes it thereto.

The seventh aspect is capable of selecting proper material and thickness at least for the rigid part, to secure characteristics such as high rigidity required for the rigid part. The first plate integrally having the resilient part can be adjusted with respect to the second plate, to select material and thickness appropriate for the resilient part. This secures characteristics such as a low spring constant required for the resilient part. It is possible, therefore, to select materials and thicknesses appropriate for the rigid part and resilient part, respectively. It is easy for the seventh aspect to simultaneously satisfy the characteristics such as high rigidity required for the rigid part and the characteristics such as a low spring constant required for the resilient part. Since the resilient part is integral with the first plate of the support plate means, the seventh aspect simplifies the structure of the head suspension.

BRIEF DESCRIPTION OF THE DRAWINGS

FIGS. 14A to 14G show steps of manufacturing the suspension of the third embodiment in which FIG. 14A shows a thermo-compression bonding step, FIG. 14B a pivot hole forming step, FIG. 14C the formed pivot hole, FIG. 14D a loose hole forming step on a metal layer, FIG. 14E the formed loose hole, FIG. 14F a loose hole forming step on a resin layer, and FIG. 14G the formed loose hole;

DESCRIPTION OF THE PREFERRED EMBODIMENTS

First Embodiment

Figure 1:
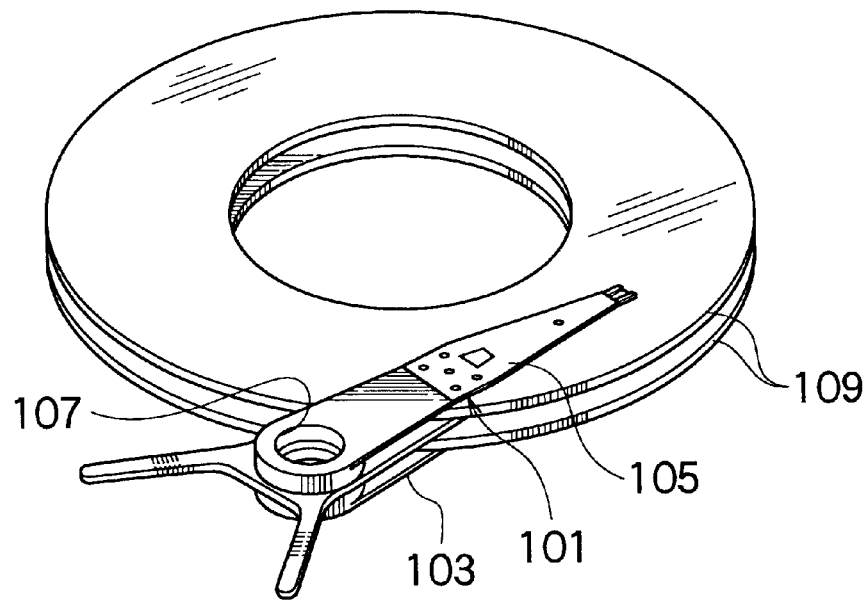
FIG. 1 is a perspective view showing a head suspension assembly and disks for a disk drive according to a prior art.
Figure 2:
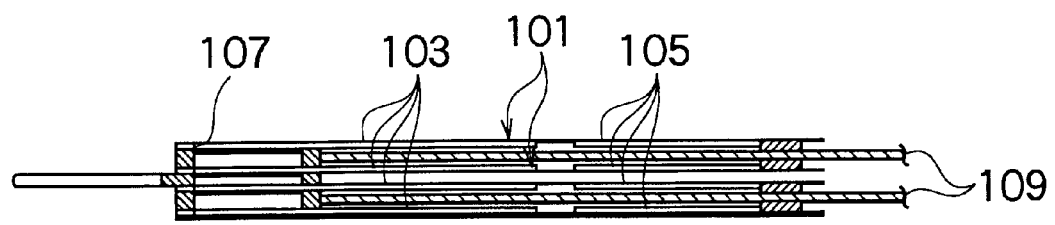
FIG. 2 is a sectional view showing the prior art.
Figure 3:
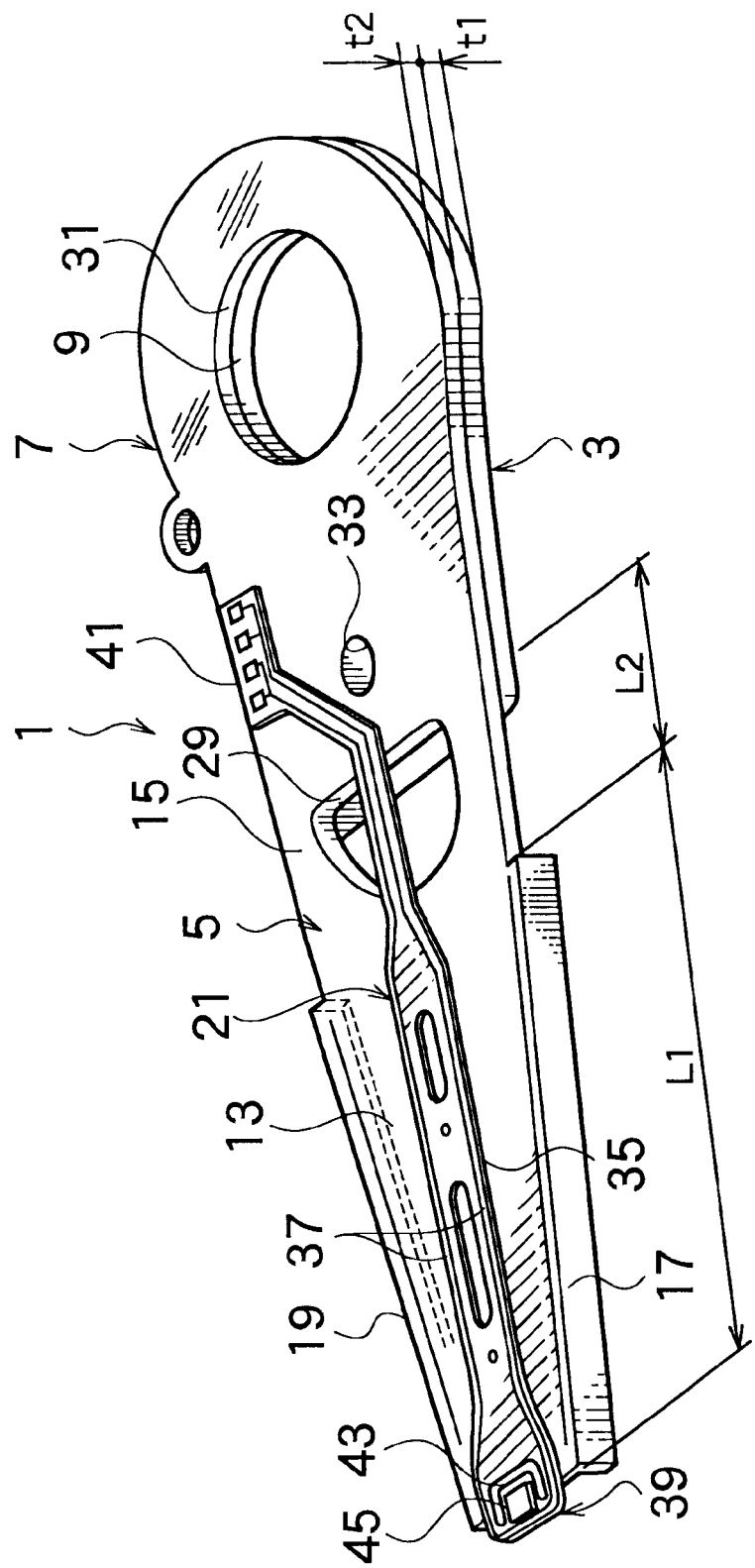
FIG. 3 is a perspective view showing a head suspension for a disk drive according to a first embodiment of the present invention.

FIG. 3 is a perspective view generally showing a head suspension for a disk drive according to the first embodiment of the present invention. The suspension 1 has a long base plate 3 and a load beam 5 integrated with a plate 7. According to the first embodiment, at least the two layered plates 3 and 7 form support plate means fitted to and supported by a support of a carriage in the disk drive. Namely, the long base plate 3 and plate 7 serve as a carriage arm. The long base plate 3 and plate 7 extend from the support of the carriage to the load beam 5 in the disk drive.

Figure 4A:
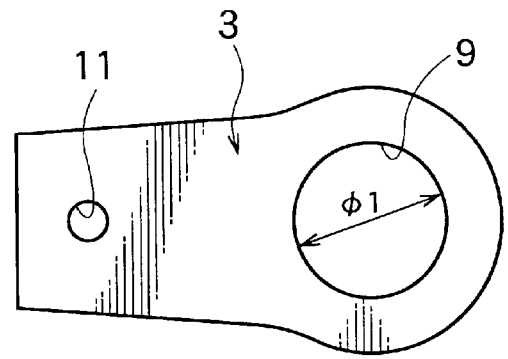
FIG. 4A is a plan view showing a long base plate of the suspension of the first embodiment.

The plate 3 is made of, for example, stainless steel and has a thickness t1 of 0.15 mm in this embodiment. Referring also to FIG. 4A, the plate 3 has a loose hole 9 at a position corresponding to the support of the carriage. The diameter φ1 of the loose hole 9 is 9.1 mm in this embodiment. The plate 3 also has a hole 11 used to position the plate 3 with respect to the plate 7.

The load beam 5 with the plate 7 is made of, for example, stainless steel and has a thickness t2 of 0.051 mm in this embodiment. Due to this thinness, etching is usable to form precision holes through the plate 7. An assembled state of the load beam 5 and the plate 3 has a thickness t of 0.201 mm in this embodiment. According to the embodiment, the maximum thickness (t2) of the load beam 5 including the plate 7 is 0.064 mm, and the thickness of the plate 3 is determined to provide an overall thickness t of 0.201 mm.

Figure 4B:
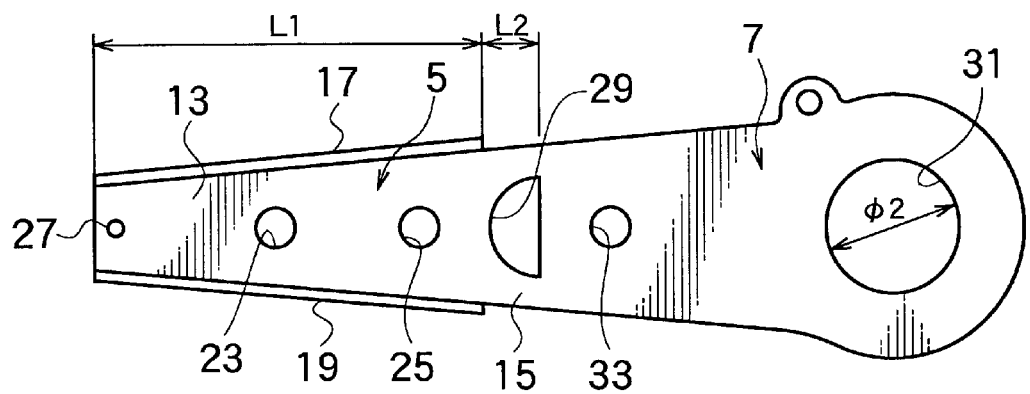
FIG. 4B is a plan view showing a load beam integrated with a plate of the suspension of the first embodiment.

The load beam 5 consists of a rigid part 13 of L1 in length and a resilient part 15 of L2 in length as shown in FIG. 3. The resilient part 15 resiliently supports the rigid part 13 with respect to the support plate means (the plates 3 and 7). Referring also to FIG. 4B, the rigid part 13 has bends 17 and 19, which secure rigidity for the rigid part 13, reduce the weight thereof, and improve the frequency and vibration characteristics of the suspension 1. The rigid part 13 also has holes 23 and 25 used to position a flexure 21 with respect to the rigid part 13, and a small projection 27 to push a tongue 45 of the flexure 21. The resilient part 15 has an opening 29 to determine a spring constant.

The plate 7 has a pivot hole 31 that precisely fits a pivot at the support of the carriage. The diameter φ2 of the pivot hole 31 is set to be smaller than the diameter φ1 of 9.1 mm of the loose hole 9 and is 9 mm in this embodiment. The plate 7 also has a hole 33 used to position the plate 7 with respect to the plate 3.

In FIG. 3, the flexure 21 is made of a metal plate 35, which is, for example, a thin resilient stainless steel rolled plate. On the metal plate 35, an insulating layer is formed, and on the insulating layer, a conductor 37 is formed. An end of the conductor 37 is connected to a terminal of a head 39, and the other end thereof is connected to a terminal 41 arranged on the plate 7. The head 39 has a slider 43 supported with the tongue 45 of the flexure 21. The tongue 45 is in contact with the small projection 27 shown in FIG. 4B.

Manufacturing steps of the suspension 1 will be explained. The plate 3 and the load beam 5 with the plate 7 are formed by etching. At this time, the loose hole 9 and positioning hole 11 are formed through the plate 3 by etching. The pivot hole 31, positioning holes 23, 25, and 33, and opening 29 are formed through the load beam 5 by etching. The bends 17 and 19 and small projection 27 are formed on the load beam 5 by press.

Figure 4C:
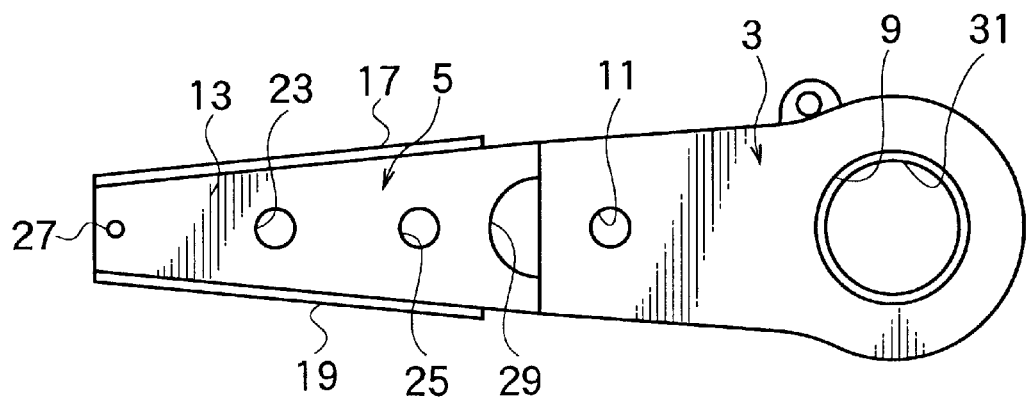
FIG. 4C is a bottom view showing the long base plate and load beam of FIGS. 4A and 4B in an assembled state.

The plate 3 and the load beam 5 integrated with the plate 7 are placed one upon another as shown in FIG. 4C. Pins are inserted into the holes 11 and 33 to align the plate 3 and load beam 5 with each other. The plate 3 is fixed to the plate 7 by laser welding, adhesives, etc.

The positioning holes 23 and 25 are used to place the flexure 21 on the rigid part 13, and the flexure 21 is fixed to the rigid part 13 by, for example, laser welding. At this time, the tongue 45 comes on the small projection 27.

When the plate 3 is fixed to the plate 7, the pivot hole 31 and loose hole 9 are substantially concentric and the pivot hole 31 is inside the loose hole 9, so that the pivot hole 31 may effectively function. As long as the pivot hole 31 is inside the loose hole 9 to make the pivot hole 31 effectively function, the center of the pivot hole 31 may not be always on the center of the loose hole 9. The pivot hole 31 is correctly fitted to and supported by the support of the carriage, so that the plates 3 and 7 may serve as a carriage arm.

According to the first embodiment, the plate 7 enhances the plate 3, to secure the carriage arm function and the thinness of the plate 3. Due to the thinness, the plate 3 is easily processed by etching.

According to the first embodiment, the pivot hole 31 is formed by etching, to greatly improve the accuracy thereof. On the other hand, the loose hole 9 may not be so accurate, and therefore, the plate 3 may be processed by etching even if the thickness t1 of the plate 3 is greater than the thickness t2 of the load beam 5 having the plate 7. Processing the plate 3 and load beam 5 by etching greatly improves the flatness of the plate 3 side as a whole.

According to the first embodiment, the plate 7 is integral with the load beam 5, to reduce the number of parts and simplifies the manufacturing and handling of the suspension 1.

Second Embodiment

Figure 5:
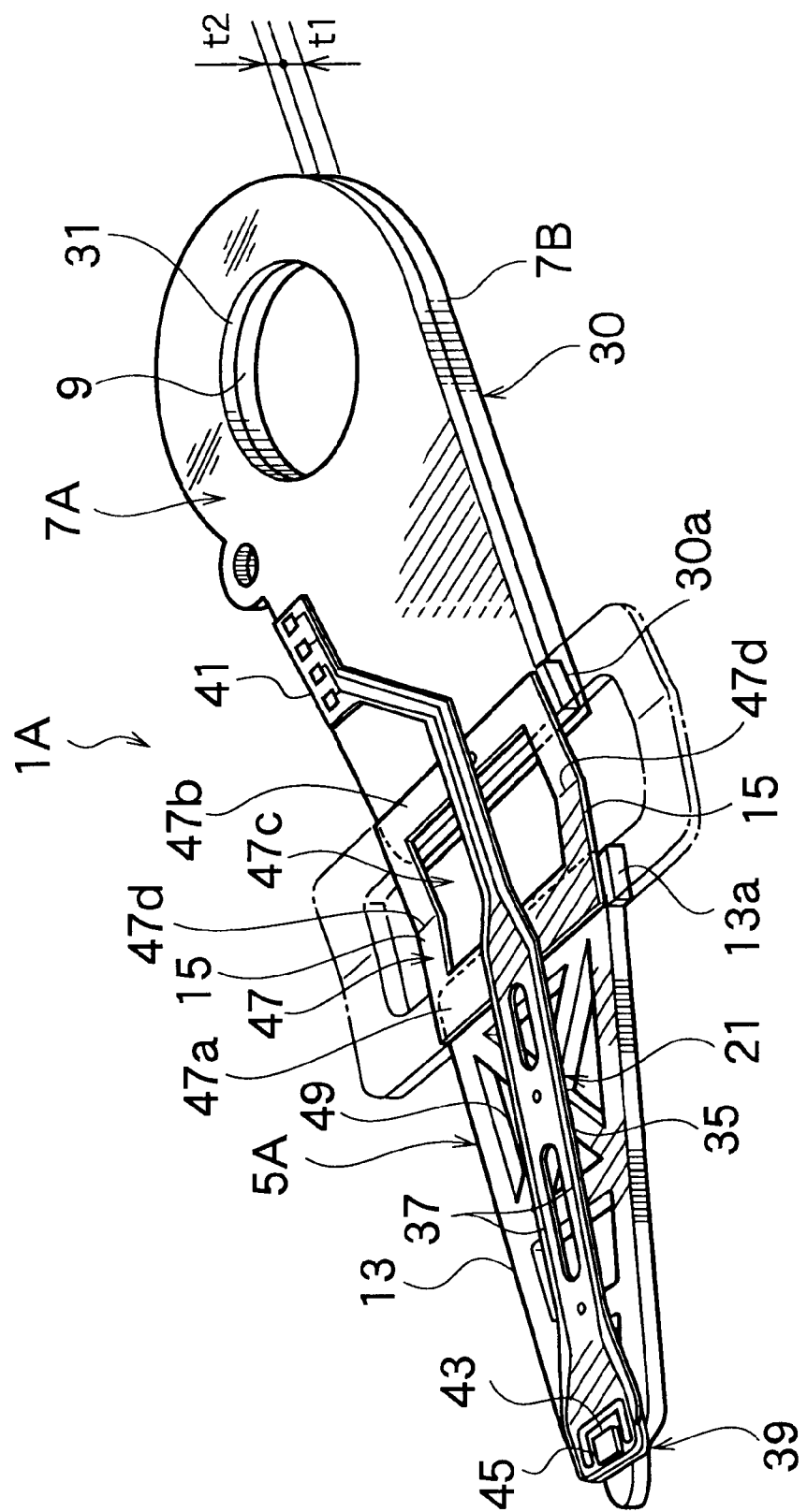
FIG. 5 is a perspective view showing a head suspension for a disk drive according to a second embodiment of the present invention.
Figure 6:
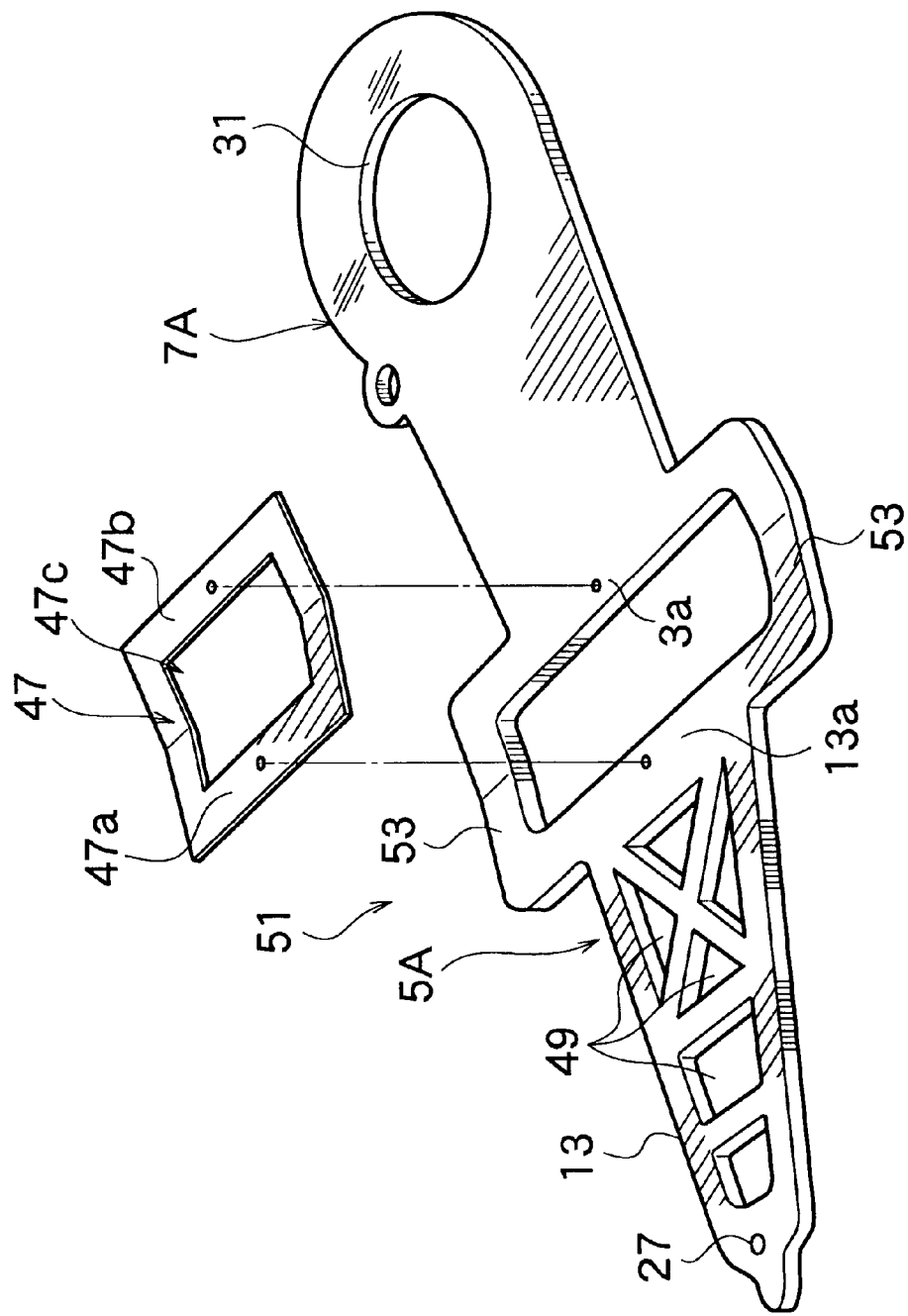
FIG. 6 is a perspective view showing a semi-finished suspension and a resilient material according to the second embodiment.

FIGS. 5 and 6 shows a head suspension for a disk drive according to the second embodiment of the present invention, in which FIG. 5 is a perspective view showing the suspension 1A and FIG. 6 is a perspective view showing a semi-finished suspension and a resilient material used to form the suspension 1A. In FIGS. 5 and 6, the same parts as those of the first embodiment are represented with like reference marks.

According to the second embodiment, a plate 7A has a thickness appropriate for precisely forming holes therethrough by etching and forms, together with a plate 7B, a long base plate 30. The long base plate 30 forms support plate means in this embodiment. Namely, the second embodiment also forms the support plate means with at least two layered plates 7A and 7B.

The plate 7B is made of, for example, stainless steel and has a thickness t1 of 0.101 mm in this embodiment. The plate 7A is formed together with the load beam 5A from, for example, stainless steel and has a thickness t2 of 0.100 mm in this embodiment. Accordingly, the total thickness t of the long base plate 30 is 0.201 mm. The plate 7A has a pivot hole 31, and the plate 7B has a loose hole 9.

A separate resilient material 47 resiliently supports the rigid part 13 of the load beam 5A with respect to the support plate means (long base plate 30). The rigid part 13 is thicker than the resilient material 47 and is equal to the plate 7A in thickness in this embodiment. The rigid part 13 has openings 49 formed therethrough.

The resilient material 47 is, for example, a thin resilient stainless steel rolled plate. An end 47a of the resilient material 47 is laid on an end 13a of the rigid part 13 and fixed thereto by, for example, laser welding. Another end 47b of the resilient material 47 is laid on an end 30a of the long base plate 30, i.e., an end of the plate 7A and is fixed thereto by, for example, laser welding. The resilient material 47 has a center opening 47c whose sides function as the resilient part 15 having a low spring constant. The resilient material 47 has a bend 47d.

In FIG. 6, the semi-finished suspension 51 is used to form the rigid part 5A and plate 7A. The semi-finished suspension 51 has the plate 7A serving as part of the long base plate 30, the rigid part 13, and a pair of bridges 53 for connecting the plate 7A and rigid part 13 to each other As shown in FIG. 5, the bridges 53 protrude sideward from the resilient material 47 when the resilient material 47 is set on the rigid part 13 and base plate 30.

The resilient material 47 is placed on the rigid part 13 and plate 7A of the semi-finished suspension 51 and is fixed thereto by, for example, laser welding. The bridges 53 are cut off from the rigid part 13 and plate 7A by, for example, press.

The plate 7B is aligned with the plate 7A and is fixed thereto by, for example, laser welding. A flexure 21 is fixed to the rigid part 13, to complete the suspension 1A.

According to the second embodiment, the thickness t2 of the semi-finished suspension 51 is properly thin to precisely form the pivot hole 31 by etching. The pivot hole 31 has, therefore, high accuracy.

The loose hole 9 is formed through the plate 7B that constitutes the long base plate 30 together with the plate 7A. The loose hole 9 may have low accuracy, and therefore, is formed by etching even if the thickness t1 of the plate 7B is relatively large.

By processing the plates 7A and 7B by etching, the second embodiment greatly improves the flatness of the long base plate 30. The second embodiment forms the resilient part 15 from the resilient material 47 that is separate from the rigid part 13 of the load beam 5A. Namely, the rigid part 13 and resilient part 15 are separately formed from their respective materials having proper thicknesses, to simultaneously satisfy requirements such as high rigidity for the rigid part 13 and a low spring constant for the resilient part 15. The resilient material 47 may be a precision rolled plate to provide the resilient part 15 with a stable low spring constant.

According to the second embodiment, the thickness t2 of the rigid part 13 and plate 7A is 0.1 mm. This thickness provides the rigid part 13 with sufficient rigidity without bends or ribs, and therefore, the rigid part 13 smooths air flows, avoids the influence of turbulence caused by the high-speed rotation of disks, and prevents the fluttering of the suspension 1A.

Figure 7:
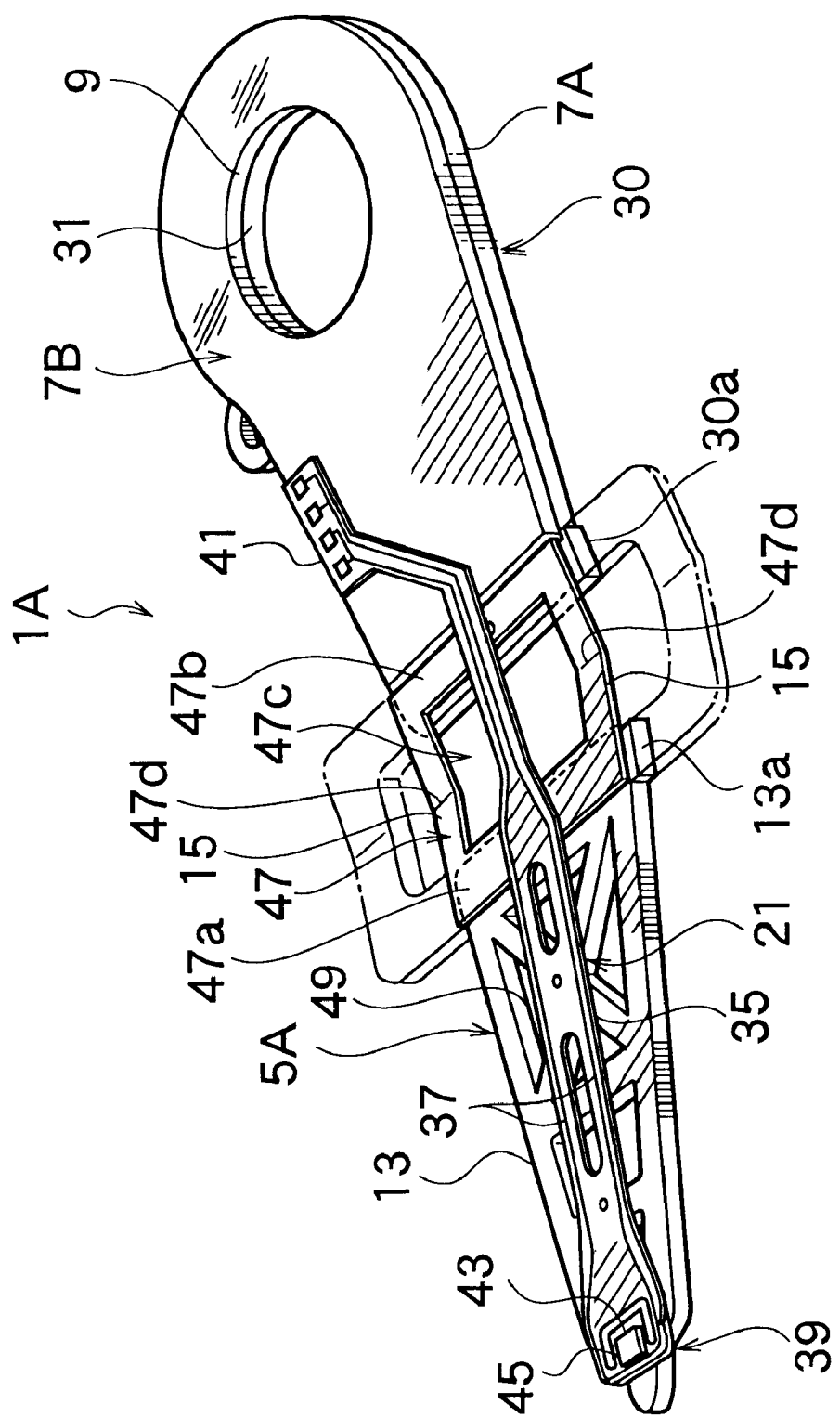
FIG. 7 is a perspective view showing a head suspension for a disk drive according to a modification of the second embodiment.

FIG. 7 shows a modification of the second embodiment. This modification stacks the plates 7A and 7B opposite to the second embodiment.

Figure 8:
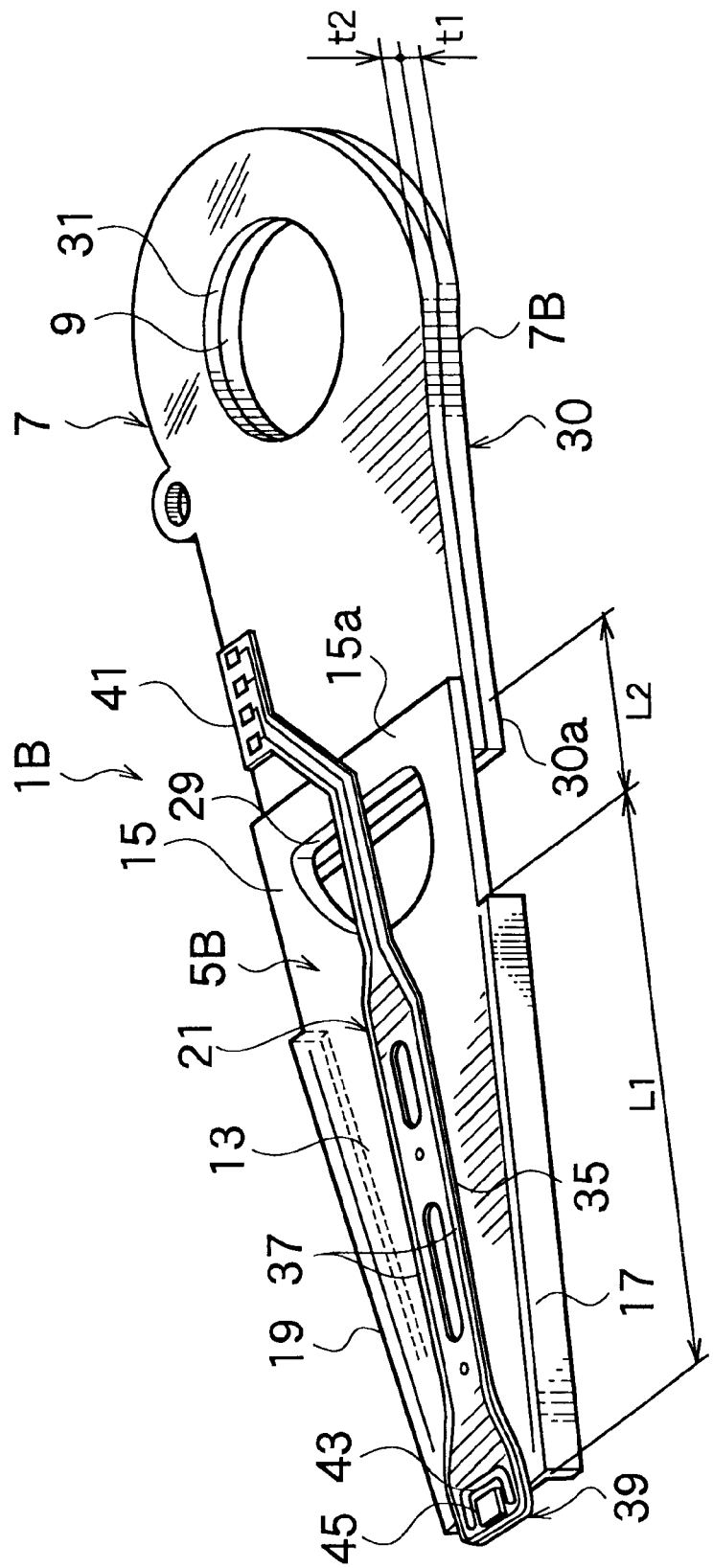
FIG. 8 is a perspective view showing a head suspension for a disk drive according to another modification of the second embodiment.

FIG. 8 is a perspective view showing a head suspension 1B for a disk drive according to another modification of the second embodiment. The suspension 1B has a long base plate 30 that is substantially the same as that of the second embodiment of FIG. 5, and a load beam 5B that is substantially the same as that of the first embodiment of FIG. 3. In FIG. 8, the same parts as those of FIGS. 3 and 5 are represented with like reference marks.

In FIG. 8, the load beam 5B has a rigid part 13 and a resilient part 15 for resiliently supporting the rigid part 13 with respect to the support plate means (long base plate 30). The rigid part 13 and resilient part 15 are integrally formed from a single plate. An end 15a of the resilient part 15, which is an end of the load beam 5B, is laid on an end 30a of the long base plate 30 and is fixed thereto by, for example, laser welding.

A plate 7A has a thickness t2 that is appropriate for precisely forming a pivot hole 31 therethrough by etching. A pivot hole 31 is formed by etching through the plate 7A. This greatly improves the accuracy of the pivot hole 31.

A plate 7B forms the long base plate 30 together with the plate 7A and has a loose hole 9. The loose hole 9 may have low accuracy, and therefore, is formed by etching even if the thickness t1 of the plate 7B is relatively large.

This modification processes the plates 7A and 7B by etching, to improve the flatness of the long base plate 30. The modification integrally forms the rigid part 13 and resilient part 15 of the load beam 5B from a single plate, to simplify the structure of the suspension 1B.

Although the embodiments and modifications mentioned above form the accurate pivot hole 31 and loose hole 9, it is possible to provide each plate with a thickness appropriate for forming precision holes therethrough by etching, so that each plate may have an accurate pivot hole formed by etching.

Third Embodiment

Figure 9:
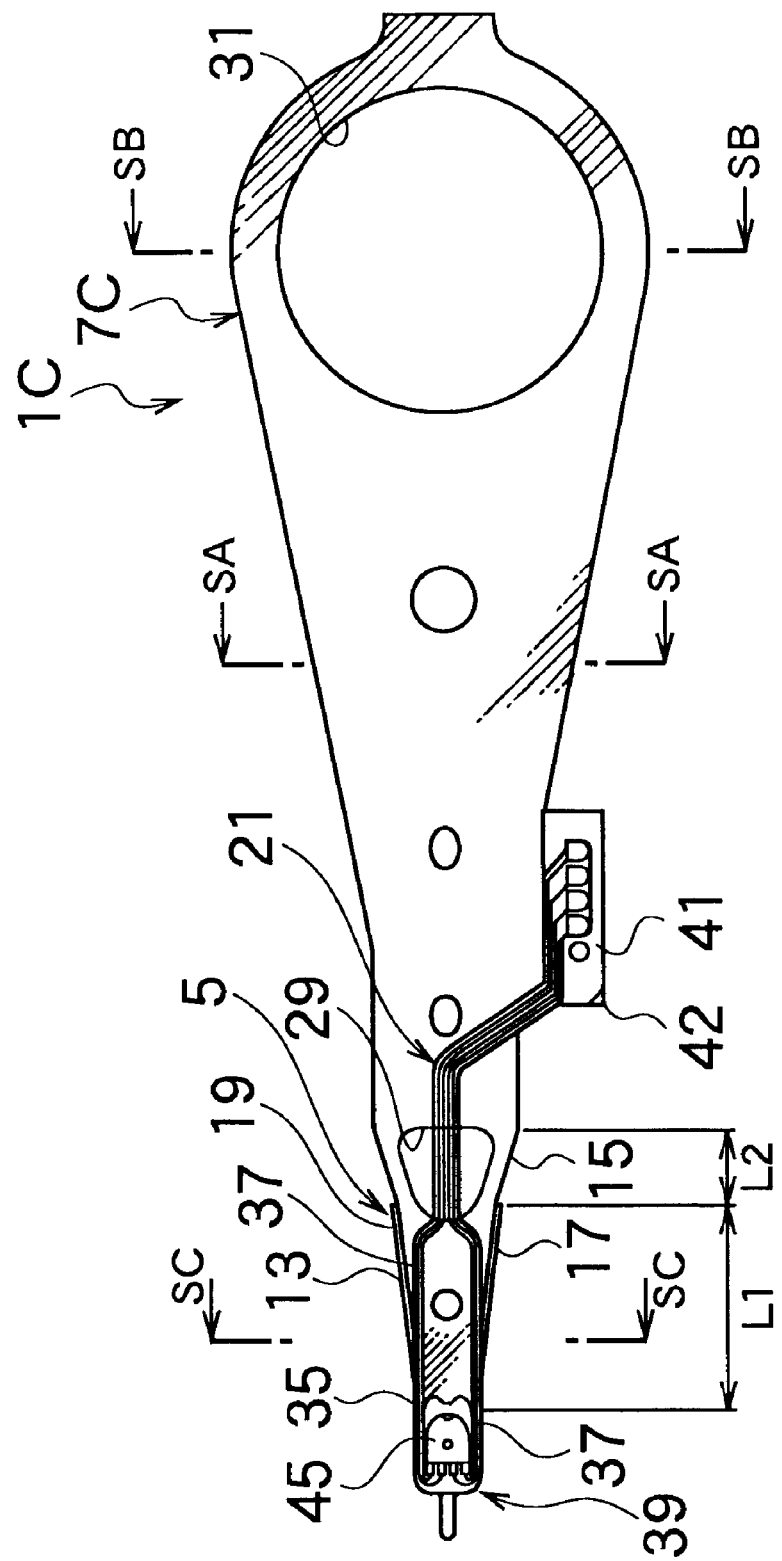
FIG. 9 is a plan view showing a head suspension for a disk drive according to a third embodiment of the present invention.
Figure 10:
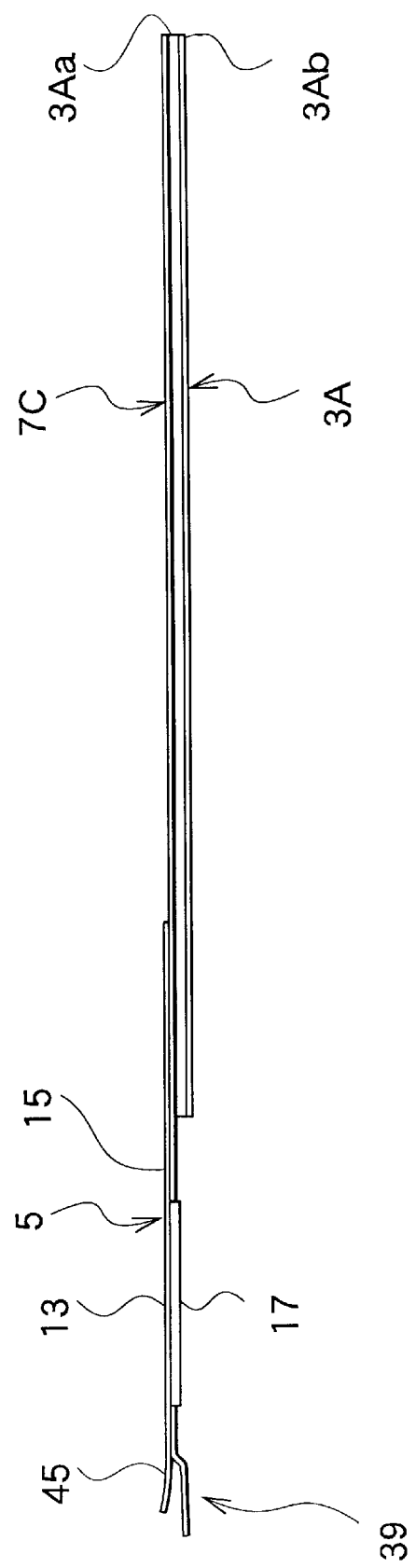
FIG. 10 is an enlarged side view showing the suspension of the third embodiment.
Figure 11:
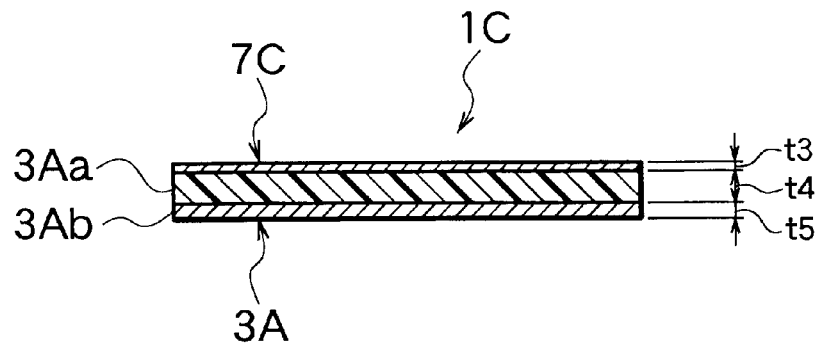
FIG. 11 is a sectional view taken along a line SA—SA of FIG. 9.
Figure 12:
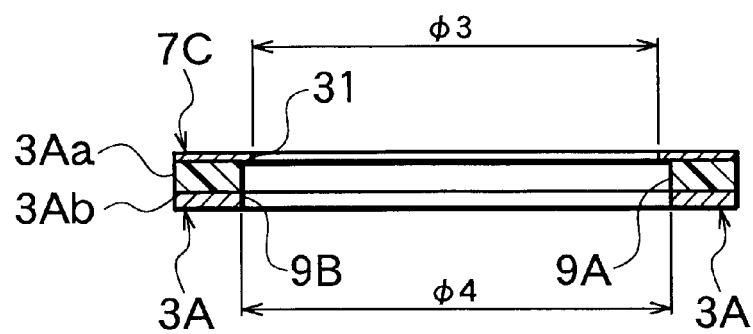
FIG. 12 is a sectional view taken along a line SB—SB of FIG. 9.
Figure 13:
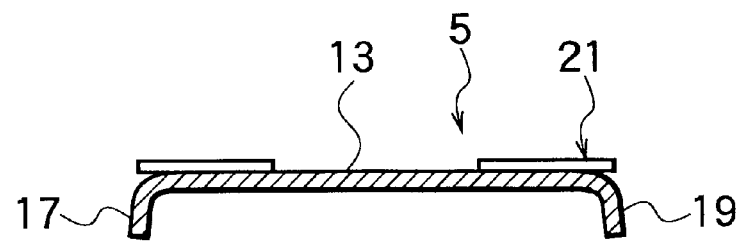
FIG. 13 is an enlarged section taken along a line SC—SC of FIG. 9.

FIGS. 9 through 14G show a head suspension for a disk drive according to a third embodiment of the present invention, in which FIG. 9 is a plan view showing the suspension 1C, FIG. 10 an enlarged side view showing the same, FIG. 11 a sectional view taken along a line SA—SA of FIG. 9, FIG. 12 a sectional view taken along a line SB—SB of FIG. 9, FIG. 13 an enlarged section taken along a line SC—SC of FIG. 9, and FIGS. 14A to 14G partial views showing manufacturing steps of the suspension 1C. In the figures, the same parts as those of FIG. 3 are represented with like reference marks.

In FIGS. 9 and 10, the suspension 1C has a load beam 5, a plate 7C integral with the load beam 5, and a plate 3A set on the plate 7C. The plate 3A is a long base plate and functions with the plate 7C as a carriage arm. The plate 3A extends from a support of a carriage to the load beam 5 in the disk drive.

The load beam 5 with the plate 7C is made of, for example, stainless steel and has a thickness t3 in the range of 0.040 to 0.200 mm in this embodiment. The thickness of the plate 7C is determined so as to precisely form holes therethrough by etching.

Referring to FIGS. 9 to 11, the plate 3A consists of a resin layer 3Aa and a metal layer 3Ab. The resin layer 3Aa is made of, for example, polyimide resin or epoxy resin to provide a specified spring constant and attenuation. The resin layer 3Aa has a thickness t4 in the range of 0.50 to 0.100 mm in this embodiment. The metal layer 3Ab is made of, for example, stainless steel, has a thickness t5 of 0.100 mm in this embodiment, and functions as the mass of a vibration system.

In this way, the third embodiment employs the plates 3A and 7C to form support plate means that is fitted to and supported by a support of a carriage and serves as a carriage arm. Namely, the support plate means has a three-layer structure. The load beam 5 and plate 7C form a main vibration system and the plate 3A a supplementary vibration system.

In FIGS. 9 and 12, the plate 7C has a pivot hole 31 that precisely fits a pivot at the support of the carriage. The pivot hole 31 has a diameter $\phi 3$ of 9.0 mm in this embodiment. The resin layer 3Aa has a loose hole 9A, and the metal layer 3Ab has a loose hole 9B. The loose holes 9A and 9B are substantially concentric with the pivot hole 31 and have each a diameter $\phi 4$ of 9.1 mm in this embodiment.

Like the first embodiment of FIG. 3, the load beam 5 has a rigid part 13 of L1 in length and a resilient part 15 of L2 in length as shown in FIGS. 9, 10, and 13. The rigid part 13 has bends 17 and 19 like the first embodiment. The resilient part 15 resiliently supports the rigid part 13 with respect to the support plate means (plates 3A and 7C).

In FIG. 9, a flexure 21 is installed like the first embodiment. The flexure 21 has a conductor 37 having an end connected to a terminal of a head 39 and the other end connected to a terminal 41. The terminal 41 is arranged on a protrusion 42 that is integral with the plate 7C and protrudes sideward.

Figure 14A:
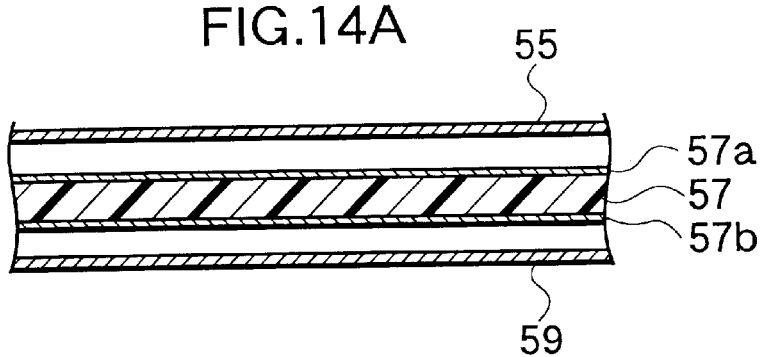

Manufacturing steps of the suspension 1C will be explained. In FIG. 14A, there are prepared flat plate materials 55, 57, and 59 having specified thicknesses and corresponding to the plate 7C, resin layer 3Aa, and metal layer 3Ab, respectively. The material 57 corresponding to the resin layer 3Aa has adhesive layers 57a and 57b on top and bottom faces thereof. The material 55 corresponding to the plate 7C is put on the adhesive layer 57a, and the material 59 corresponding to the metal layer 3Ab is put on the adhesive layer 57b. The stacked materials 55, 57, and 59 are joined together by thermo-compression bonding, to form a three-layer structure. The three-layer structure is etched to form a semi-finished product for the load beam 5 and plates 3A and 7C of FIGS. 9 and 10.

Figures 14B, 14C:
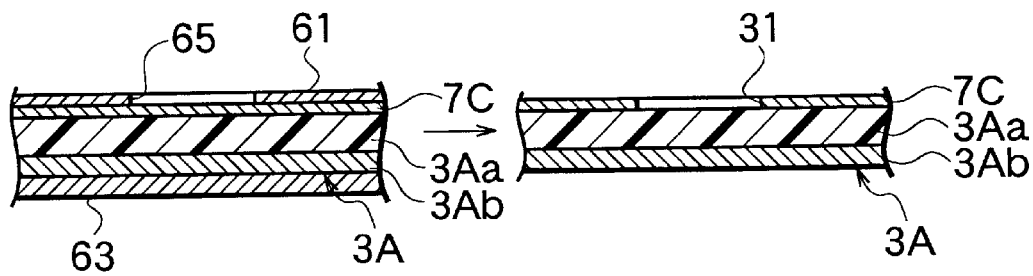

The pivot hole 31 and loose holes 9A and 9B are formed as shown in FIGS. 14B to 14G. In FIG. 14B, a resist 61 is applied to the semi-finished plate 7C, and a resist 63 is applied to the semi-finished metal layer 3Ab. The resist 61 has a hole 65. In FIG. 14C, the pivot hole 31 is formed through the plate 7C by etching.

Figures 14D, 14E:
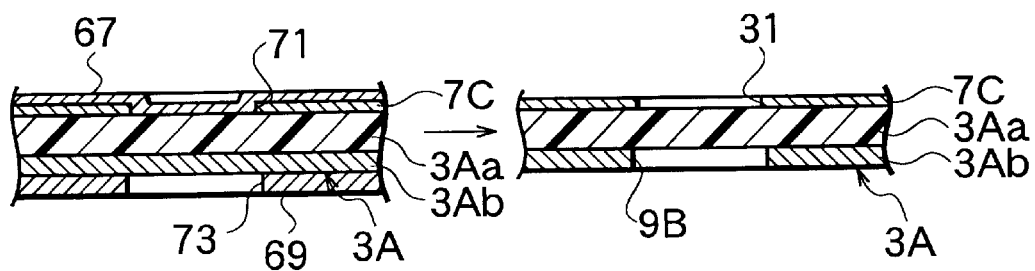

In FIG. 14D, a resist 67 is applied to the plate 7C, and a resist 69 is applied to the metal layer 3Ab. The resist 67 has a projection 71 that tightly fits the pivot hole 31 of the plate 7C. The resist 69 has a hole 73. In FIG. 14E, the loose hole 9B is formed by etching through the metal layer 3Ab.

Figures 14F, 14G:
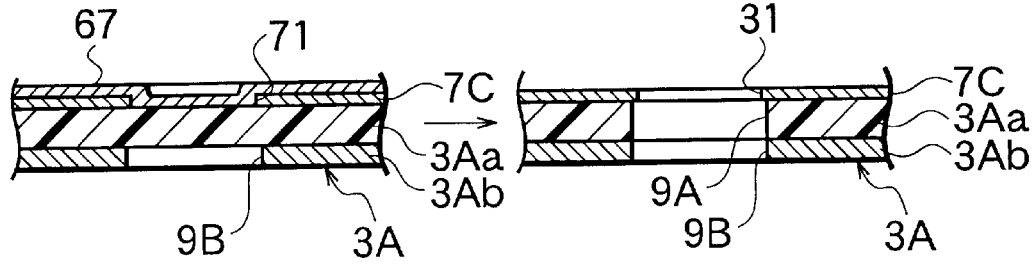

In FIG. 14F, the resist 67 is kept on the plate 7C, and the resist 69 of FIG. 14D is removed from the metal layer 3Ab. In FIG. 14G, the loose hole 9A is formed through the resin layer 3Aa.

An opening 29 and holes are formed by etching like the first embodiment. The bends 17 and 19, a small projection, etc., are formed on the load beam 5. The flexure 21 is installed like the first embodiment.

According to the third embodiment, the pivot hole 31 and loose holes 9A and 9B are substantially concentric, and the pivot hole 31 is inside the loose holes 9A and 9B so that the pivot hole 31 may effectively function. As long as the pivot hole 31 is inside the loose holes 9A and 9B to make the pivot hole 31 effectively function, the pivot hole 31 and loose holes 9A and 9B may not precisely be concentric. The pivot hole 31 is precisely fitted to a pivot at the support of the carriage, and the plates 3A and 7C serve as a carriage arm.

According to the third embodiment, the load beam 5 and plate 7C form a main vibration system, and the plate 3A forms a supplementary vibration system, to improve the vibration characteristics of the suspension 1C. More precisely, a damping effect provided by the three-layer structure suppresses vertical and horizontal vibrations of the load beam 5 and plate 7C against vibration causing inputs due to air flows or the high-speed rotation of disks, to thereby surely improve the vibration characteristics of the suspension 1C.

Fourth Embodiment

Figure 15:
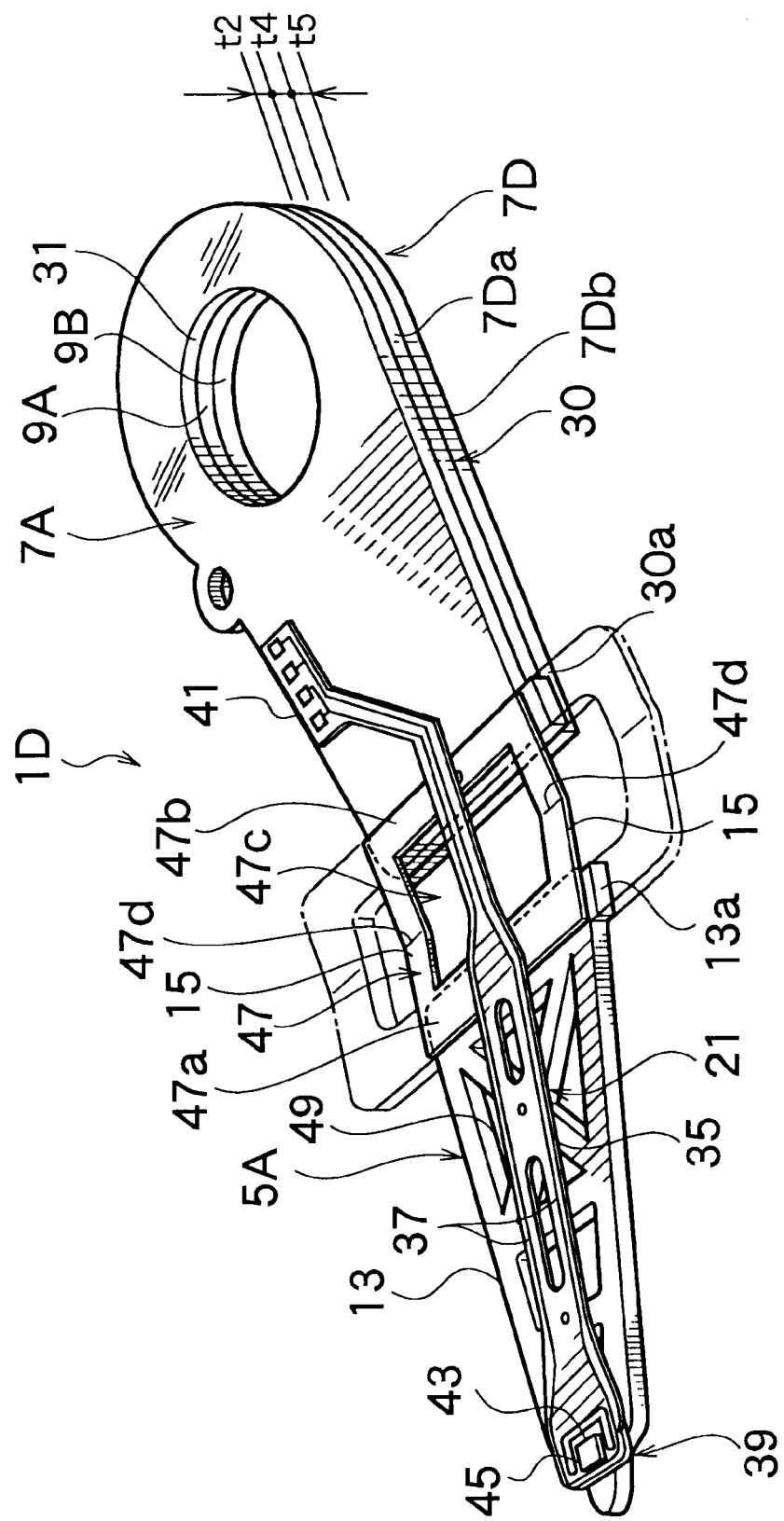
FIG. 15 is a perspective view showing a head suspension for a disk drive according to a fourth embodiment of the present invention.

FIG. 15 is a perspective view showing a head suspension 1D for a disk drive according to the fourth embodiment of the present invention. This is a modification of the second embodiment of FIG. 5. In FIG. 15, the same parts as those of the suspension 1A of the second embodiment are represented with like reference marks.

The suspension 1D of the fourth embodiment has a long base plate 30 consisting of plates 7A and 7D. The long base plate 30 forms support plate means in this embodiment. The thickness of the plate 7A is appropriate for precisely forming holes therethrough by etching. The plate 7D consists of a resin layer 7Da and a metal layer 7Db, like the resin layer 3Aa and metal layer 3Ab of the third embodiment. Namely, the long base plate 30 of the fourth embodiment has a three-layer structure.

The operation and effect of the fourth embodiment are substantially the same as those of the second embodiment. Similar to the third embodiment, the three-layer structure of the fourth embodiments provides a damping effect to improve the vibration characteristics of the suspension 1D.

Like the second embodiment, the plate 7D may be replaced with the plate 7B of FIG. 7.

Fifth Embodiment

Figure 16:
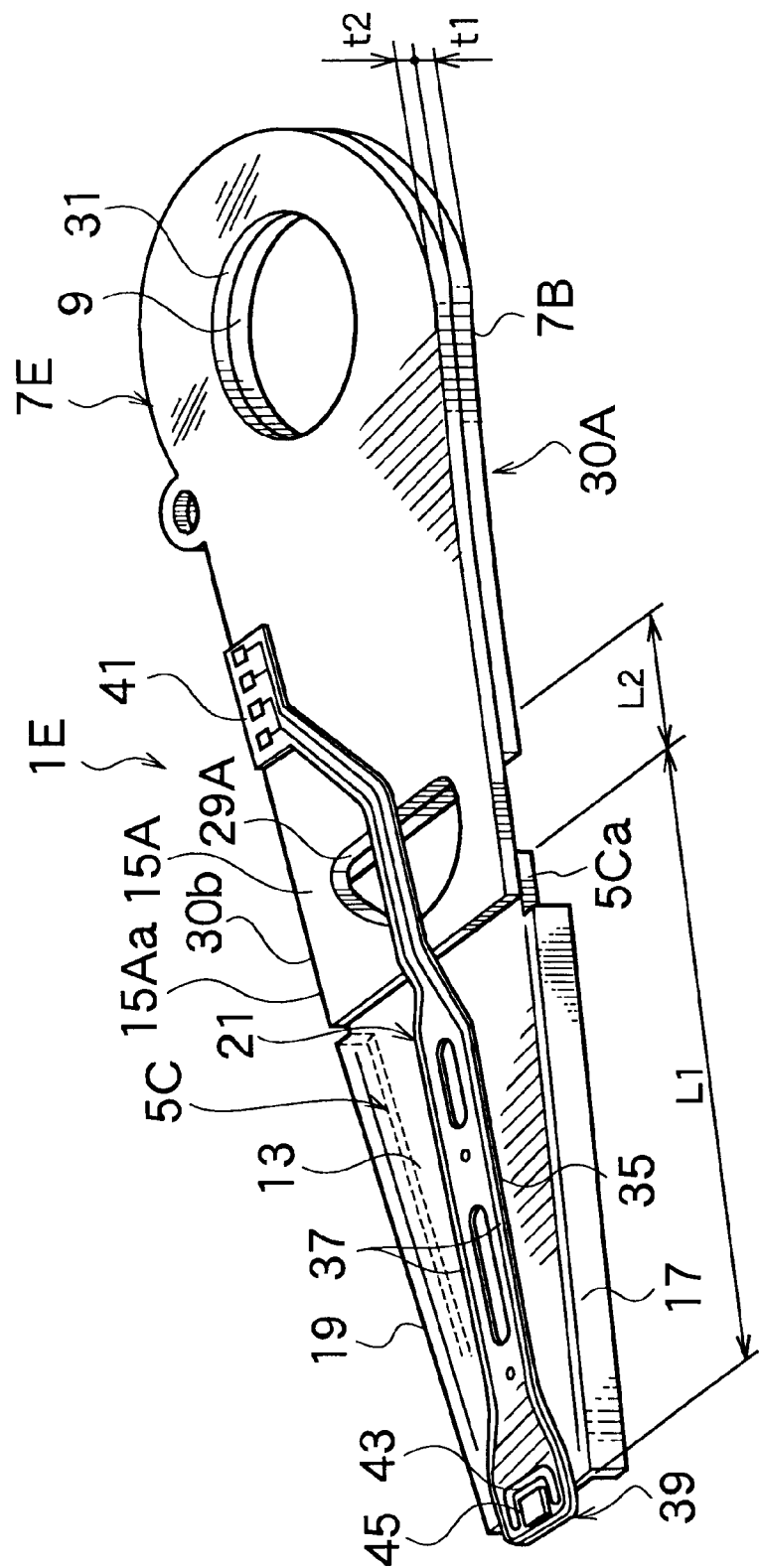
FIG. 16 is a perspective view showing a head suspension for a disk drive according to a fifth embodiment of the present invention.

FIG. 16 is a general perspective view showing a head suspension for a disk drive according to the fifth embodiment of the present invention. The suspension 1E has a long base plate 30A whose structure is substantially the same as that of the long base plate 30 of the suspension 1B of the second embodiment of FIG. 8. The structure of a load beam 5C of the fifth embodiment is substantially the same as that of the load beam 5 of the suspension 1 of the first embodiment of FIG. 3. Accordingly, the same parts as those of FIGS. 3 and 8 are represented with like reference marks.

In FIG. 16, the load beam 5C has a rigid part 13. According to the fifth embodiment, a resilient part 15A for resiliently supporting the rigid part 13 with respect to the support plate means (long base plate 30A) is provided for the long base plate 30A instead of the load beam 5C. The resilient part 15A is integrally formed with a plate 7E, which is part of the long base plate 30A, from a single plate. The load beam 5C has an end 5Ca that is laid on an end 15Aa of the resilient part 15A, which is an end of the plate 7E, and is fixed thereto by, for example, laser welding.

According to this embodiment, the plate 7E has a thickness t2 that is appropriate for precisely forming holes therethrough by etching. The plate 7E is etched to form a pivot hole 31, to greatly improve the accuracy of the pivot hole 31.

A plate 7B that forms another part of the long base plate 30A has a loose hole 9. As mentioned above, the loose hole 9 may not be so precise, and therefore, even if the thickness t1 of the plate 7B is slightly thick, the loose hole 9 can be formed by etching. The plates 7E and 7B are both formed by etching, to greatly improve the flatness of the long base plate 30.

In addition, this embodiment integrally forms the resilient part 15A with the plate 7E of the long base plate 30A and fixes the end 5Ca of the load beam 5C onto the end 15Aa of the resilient part 15A. As a result, this embodiment can select suitable material and thickness for at least the rigid part 13, to secure characteristics such as high rigidity required for the rigid part 13.

The plate 7E integral with the resilient part 15A can be adjusted with respect to the plate 7B, so that material and thickness suitable for the resilient part 15A may be selected. This secures characteristics such as a low spring constant required for the resilient part 15A. It is possible to select materials and thicknesses appropriate for the rigid part 13 and resilient part 15A, respectively. It is easy, therefore, to simultaneously satisfy characteristics such as high rigidity required for the rigid part 13 and characteristics such as a low spring constant required for the resilient part 15A.

Integrally forming the resilient part 15A with the plate 7E of the long base plate 30A from a single plate simplifies the structure of the suspension 1E.

Figure 17:
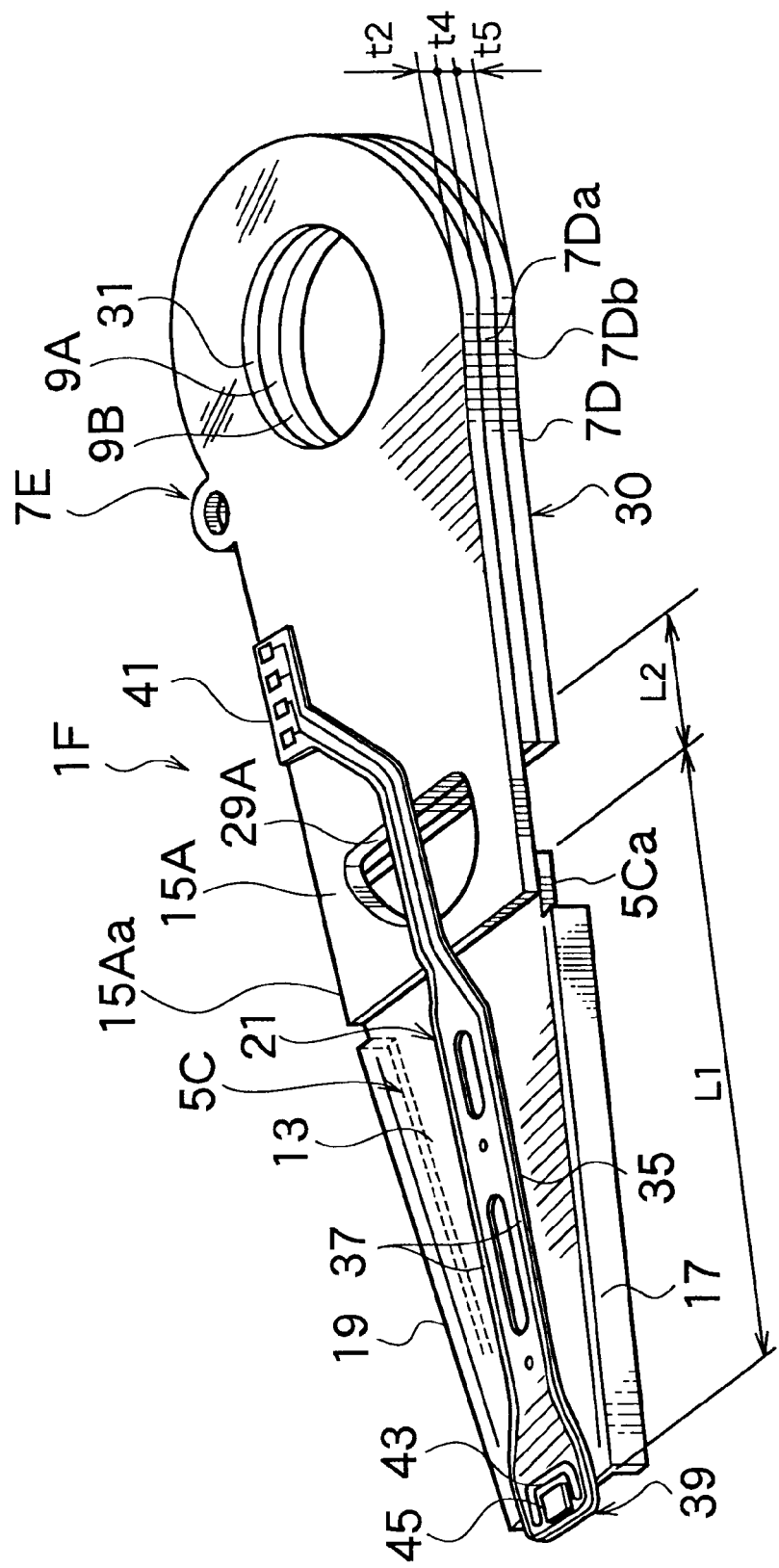
FIG. 17 is a perspective view showing a head suspension for a disk drive according to a modification of the fifth embodiment.

FIG. 17 is a perspective view showing a head suspension for a disk drive according to a modification of the fifth embodiment of FIG. 16. The parts corresponding to those of the suspension 1E of the fifth embodiment of FIG. 16 are represented with like reference marks.

According to this modification, a plate 7E has a thickness t2 that is appropriate for precisely forming holes therethrough by etching. The plate 7E and a plate 7D form a long base plate 30B. The long base plate 30B forms support plate means in this modification. The plate 7D consists of a resin layer 7Da and a metal layer 7Db. The resin layer 7Da and metal layer 7Db are structured like the resin layer 3Aa and metal layer 3Ab of the third embodiment. Namely, this modification provides the support plate means of the suspension 1F with a three-layer structure.

As a result, this modification provides the same effect as the fifth embodiment, and like the third embodiment, a damping effect due to the three-layer structure, to improve the vibration characteristics of the suspension 1F as a whole.

Although each embodiment mentioned above employs a pivot hole 31 and a loose hole 9, each of the layered two plates of each embodiment may have a thickness appropriate for accurately forming holes therethrough by etching, so that a pivot hole is precisely formed through each plate by etching.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes which come within the meaning and range of equivalency of the claims are therefore intended to be embraced therein.

What is claimed is:

1. A head suspension for a disk drive, consisting of:
   support plate means fitted to and supported by a support of a carriage in the disk drive, the support plate means serving as a carriage arm of the carriage; and
   a load beam resiliently supported by the support plate means consisting of a rigid part and a resilient part, the load beam adapted for applying load onto a slider of a head, wherein:
   the support plate means consists of layered first and second plates;
   a pivot hole to be fitted to and supported by the support of the carriage is formed through the first plate with the size and shape of the pivot hole being the same as those of a cross section of the support of the carriage where the pivot plate is fitted to; and
   one of a pivot hole and a loose hole is formed through the second plate, the pivot hole being equal to and concentric with the pivot hole of the first plate, the loose hole being larger than and substantially concentric with the pivot hole of the first plate.

2. The head suspension of claim 1, wherein:
   the first and second plates form a base plate to be fitted to and supported by the support of the carriage, the base plate, when fitted to the support of the carriage, extending from the support of the carriage toward the load beam.

3. The head suspension of claim 1, wherein:
   the first plate is integral with the load beam; and
   the second plate forms a base plate to be fitted to and supported by the support of the carriage, the base plate, when fitted to the support of the carriage, extending from the support of the carriage toward the load beam.

* * * * *